Oct. 31, 1967 M. R. KARECKI 3,350,024

TAPE RECORDER

Filed Oct. 21, 1965 2 Sheets-Sheet 1

Inventor
Marion R. Karecki
By Brown, Jackson, Boettcher & Dienner
Att'ys.

Inventor
Marion R. Karecki
By Brown, Jackson, Boettcher & Dienner
Att'ys.

United States Patent Office 3,350,024

Patented Oct. 31, 1967

3,350,024

TAPE RECORDER

Marion R. Karecki, St. Joseph, Mich., assignor to V-M Corporation, Benton Harbor, Mich., a corporation of Michigan Filed Oct. 21, 1965, Ser. No. 499,872

5 Claims. (Cl. 242—55.12)

ABSTRACT OF THE DISCLOSURE

In a tape recorder having interlocking controls by which it is selectively set for conditions such as fast forward, play, record, rewind and stop, the provision of a pause control button which is depressible to override the set condition of the recorder and to temporarily halt tape travel and which is thereafter deactivated by lifting to restore the interrupted condition of the recorder.

This invention relates to a tape recording and/or playing device, and more particularly to a novel construction of mechanism for temporarily stopping and thereafter restarting the tape travel.

Although the present invention is hereinafter described in connection with recording and/or playing devices employing magnetic tape, it will be understood that the principles of the invention apply equally as well to recording and playing devices employing wire or belts. Thus it will be sufficient for the purposes thereof to explain the present invention in connection with tape recorders or players only.

Machines or devices of this character are usually provided with one or more playing and/or recording heads past which the tape or wire is selectively driven from a supply reel to a take-up reel by means of a capstan which frictionally engages the tape. Conventionally, the rotational movement of the capstan is transmitted to the tape or wire by means of a pressure roller which is adapted for movement into and out of cooperative engagement with the capstan to frictionally compress the tape therebetween. Means are usually also provided in the form of a pair of brake bands mounted on pivotal arms and are actuatable through manually operated means so as to be releasably urged into frictional engagement with the outer periphery of drums provided the spindles of the supply and take-up reels. Such means are utilized both to effect a stopping of the reel rotation and also to effect a drag on the tape during the recording and playing actions.

When using the tape machines to record, it is desirable to be able to temporarily halt the tape travel at irregular intervals, as for example so as to avoid the necessity of having to record undesirable material or to record during lulls in a conversation or at intermission time. Also it is useful to be able to instantly stop and start the tape during playback of a recording, for example when editing the tape.

A principal object of the present invention therefore is to provide a tape or wire recording and playing machine with manually operated auxiliary means which may be conveniently operated to positively and instantaneously stop the tape travel but without having to touch or adjust the other manual settings of the machine. For example, in some machines, a stop button is provided which when depressed sets the reel brake mechanism but also clears the other controls and so requires a resetting of the machine each time it is used.

A feature of the present invention is that such auxiliary means are provided in the form of a button which may be manually depressed to set the reel brake and at the bottom of its travel also automatically locks its setting of the reel brake.

A further feature of the invention is that said depressing act also automatically effects release of the frictional engagement of the pressure roller on the capstan so that the halt of the tape advance is near instantaneous.

A companion feature thereto is that the automatically effected lock is as quickly relieved and the tape restarted by simply raising or lifting the button in the opposite direction.

Thus, a feature of the invention is that a temporary braking action on the tape also can be obtained in one positive stroke of the operating member and there is no necessity to manually hold the member in a depressed position or to effect auxiliary means or a sidewise manipulation of the member to lock the same. The stopping of the tape advance and its restarting is therefore essentially foolproof and requires no special effort on the part of the operator other than to depress the "same button" as far as it will go, and which distance can be kept relatively short.

Still another object and/or feature of the invention is to provide a mechanism which will not only lock the brake action on the supply reel automatically on the depression of the button, but will be achieved by a construction that is also simple in nature and highly practical to manufacture.

Thus, in one embodiment of the invention, a slide member is mounted for longitudinal movement into and out of a position where it acts on the pivotally mounted brake band bearing arm to initiate the braking action and which movement simultaneously operates a lever associated with the pressure roller to move the pressure roller away from the capstan, the motion of said first mentioned lever being in response to the depressing of an axially offset part of a rotatably mounted button which is mounted so that when depressed it turns about an axis disposed generally transverse to the direction of movement of said slide member. Continued depressing of said operating button carries it to a position determined by stop member against which a further part engages bringing into play spring means which releasably lock the button in its depressed position and thereby prevents advance of the tape until released by raising the button back to its original position. In keeping with the invention, spring means are connected between the brake actuating lever and the pressure roller relieving lever and serves to hold the first lever in a normally retracted position out of operating relation with the pivotally mounted brake band carrying arm until activated by depressing of the actuating button.

Thus a further feature of the invention is that mechanism is provided for temporarily halting the tape travel advance which is extremely simple in its operation as well as effective in its function.

Many other objects, advantages and/or features will be at once apparent or will become so upon consideration of the one embodiment of the invention which is illustrated by the accompanying drawings and hereinafter more specifically described in connection therewith.

Referring now to the drawings.

Figure 1:
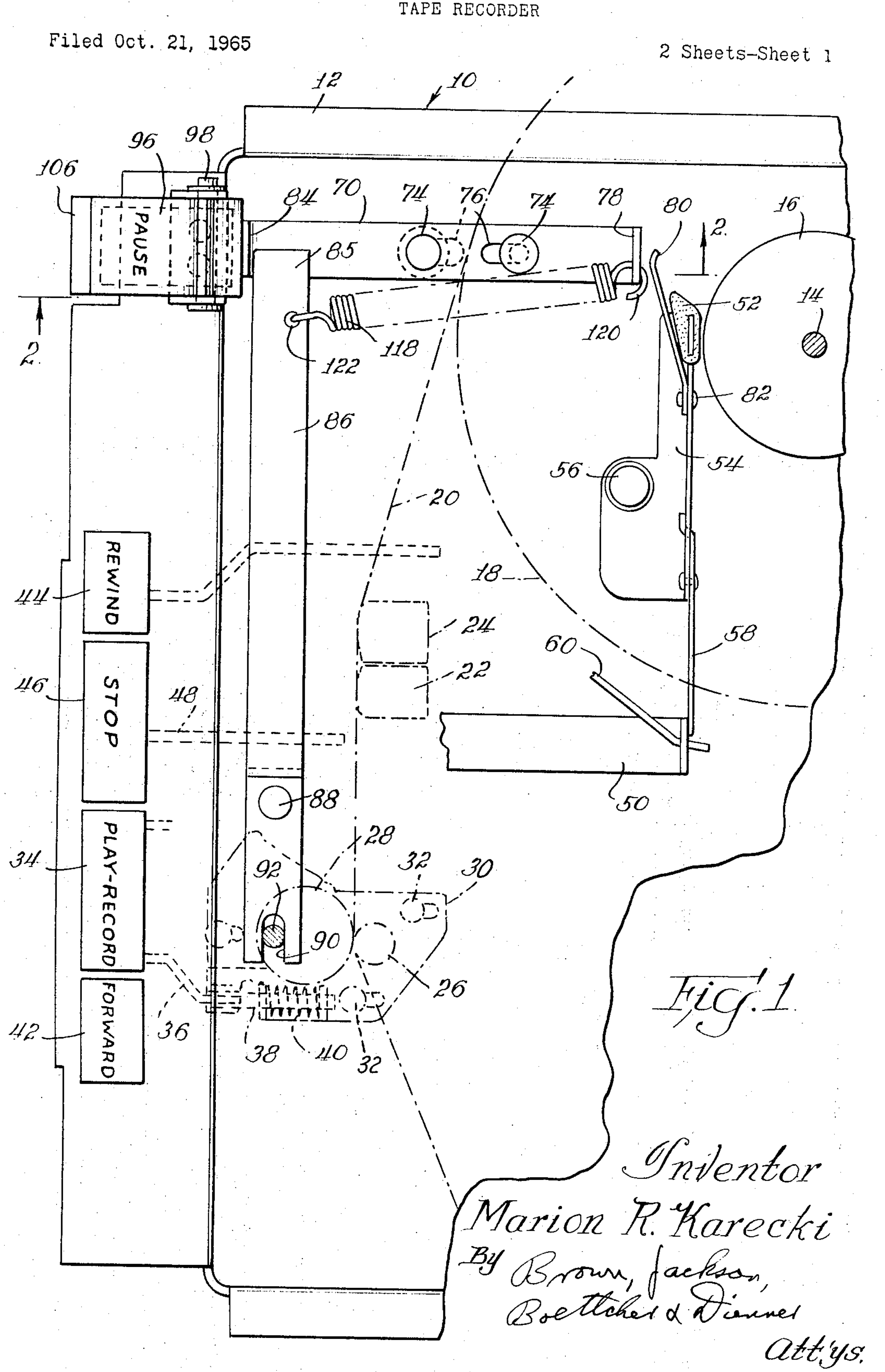
FIGURE 1 is a partially fragmented plan view of a tape recording and playing machine illustrating one form of the invention and wherein construction details and parts of the recorder not essential to an understanding of the invention have been omitted for clarity of presentation and understanding thereof.
Figures 2, 3, 4, 5:
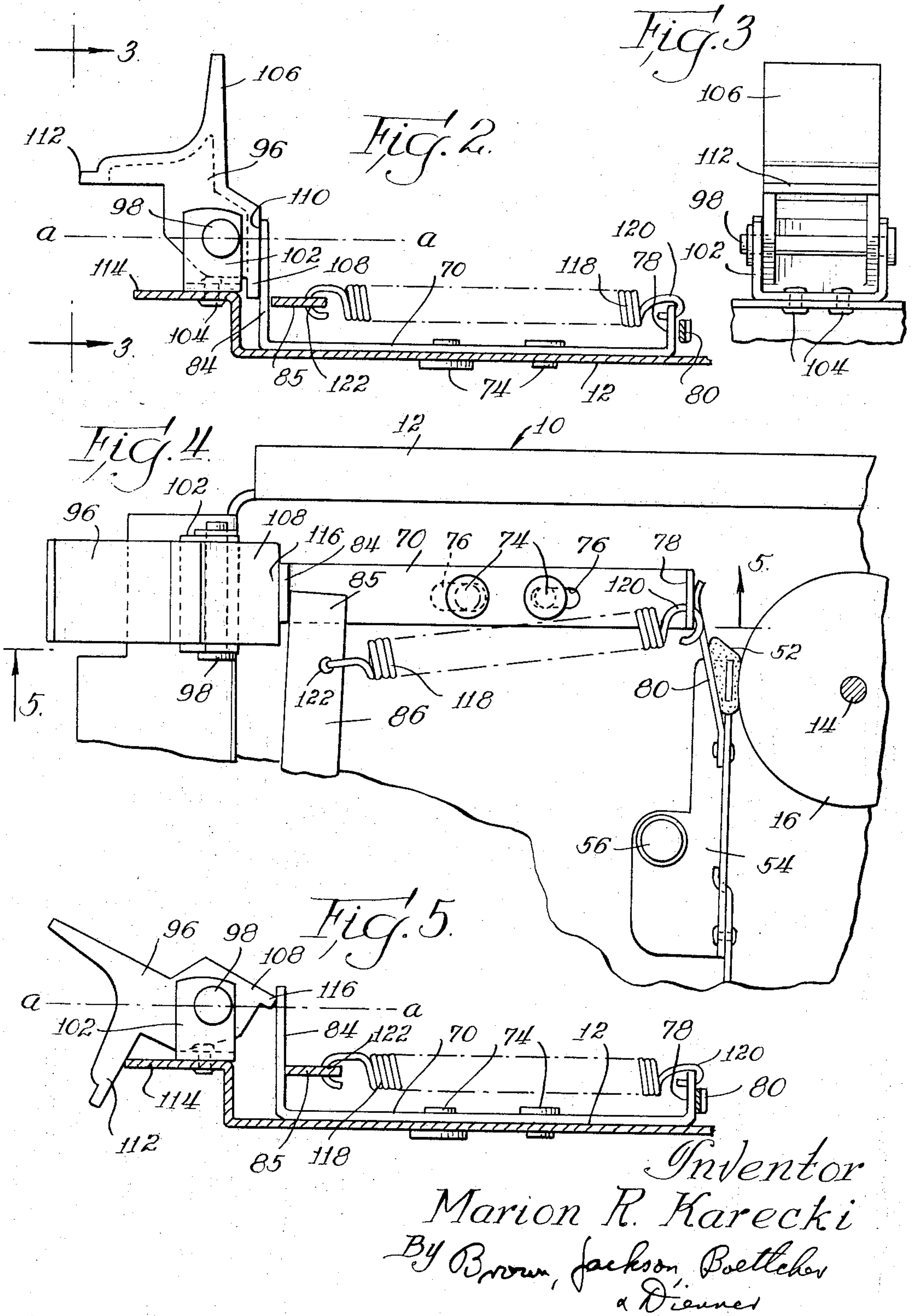
FIGURE 2 is a sectional view taken along lines 2—2 of FIGURE 1 looking in the direction indicated by the arrows and illustrates the machine set for playing and/or recording.
FIGURE 3 is an end view of the button which actuates the reel brake and is taken along lines 3—3 of FIGURE 2 looking in the direction indicated by the arrows.

FIGURE 4 is a view generally similar to FIGURE 1, but more fragmented and illustrates the operating button in its depressed position and with the brake applied to the supply reel drum to halt the tape travel advance; and FIGURE 5 is a sectional view taken along lines 5—5 of FIGURE 4 looking in the direction indicated by the arrows to show more clearly the new position of the operating button and how the construction obtains the automatic locking feature which comprises the invention.

Referring now more specifically to the several views which comprise the drawing, it will be understood that only those portions of the illustrated tape recording and playing machine required to disclose an embodiment of the invention have been illustrated and that in those omitted respects the tape recording and playing machine is of conventional construction. Also in said views it will be understood that like parts are identified by like reference numerals. Referring therefore first to FIGURE 1, the invention is illustrated embodied in a tape recording and playing machine of conventional construction indicated generally by reference numeral 10. For the purposes of this invention such machine will include a housing or base plate 12 on which is rotatably supported a spindle 14 having a brake drum 16 affixed thereto. The upper end of said spindle is adapted to removably receive a supply reel shown in phantom lines at 18 loaded with tape 20 which is shown fed therefrom past a playing head 22 and a recording head 24 which are alternatively related to the tape 20 by means not shown. At 26 is a capstan rotatably mounted on base plate 12 and operatively connected to a reversible electric motor (not shown) so as to be driven thereby and at a constant peripheral velocity. Tape 20 leads to a take-up reel (not shown) which is removably mounted on a rotatable spindle corresponding to the first mentioned spindle 14, said take-up spindle being effectively clutched to capstan 26 and/or its motor so as to turn therewith to permit winding of the tape on the take-up reel as is conventional. At 28 is a pressure roller supported on a guide 30 and freely rotatable thereon about an axis disposed parallel to the axis of the capstan 26, guide 30 being adapted for reciprocal movement in directions determined by cooperating slots and pins indicated generally at 32 which permit moving the pressure roller 28 relative to the capstan to effect frictional engagement of the tape 20 therebetween. With pressure roller 28 bearing against the capstan, the rotational movement of the capstan is transmitted to the tape frictionally engaged therebetween so as to drive the same off the supply reel 18, past the selectively energized one of the playing and recording heads 22, 24 and on to the tape-up reel. At 34 is a manually depressible button conveniently located in the upper surface of the machine housing which is so adapted that when depressed it acts through arm 36 to cause lever 38 connected to the pressure roller guide 30 to move the guide 30 and thereby pressure roller 28 against the action of spring 40 into the aforedescribed relation with the capstan 26 to effect movement of the tape 20. The details of construction by which button 34 effects said movement of the pressure roller and its guide 30 except insofar as thus described, is without pertinence to the invention being claimed and will be understood to be of conventional construction. At 42 is a button having conventional mechanism associated therewith which is actuated by depression of button 42 to effect movement of tape 20 in one direction so that the tape 20 is fed off the supply reel 18 onto the take-up reel which is simultaneously rotated by a clutch in conventional manner. At 44 is a rewind button having associated mechanism which is operated on depression of button 44 to effect rotation of the tape 20 in the opposite direction and also drivingly engage the supply reel spindle 14 to effect movement of the tape 20 back to the supply reel 18. At 46 is a stop button which has means (not shown) associated therewith to clear buttons 34, 42 and 44 and their associated mechanisms when it is depressed. Button 46, when depressed, also actuates a lever 48 connected to a lever 50 in conventional manner to set the reel brake mechanism as will now be described. Referring still to FIGURE 1, associated with brake drum 16 is a brake band or the like 52, shown supported on one end of an arm 54 which is pivotally mounted on shaft 56. Arm 54 has its opposed end connected to a spring operating arm 58 riveted to the free end of operating lever 50. By conventional mechanism (not shown) stop button 46 is so connected to lever 50, that when depressed, button 46 causes lever 50 to move toward the stop button, the effect of which movement is to rotate arm 54 about shaft 56 and thereby force brake band 52 in frictional engagement with the periphery of drum 16. It will be appreciated further that each of buttons 34, 42, 44 and 46 have means associated therewith (not shown) which operate to hold the button in its depressed condition and, as mentioned, when stop button 46 is depressed, it functions to also release the other three buttons 34, 42, 44. Thus, when stop button 46 is depressed it serves to hold brake band 52 against drum 16 and also clears the prior settings of the machine 10 so that reels may be removed and/or the machine readied for a further operation. For example, in the depressed position of stop button 46 the play-record button 34 is returned to its raised position, whereupon spring 40 operates to move pressure roller 28 away from the capstan 26 and its driving connection with the tape 20 is interrupted. Upon release of the stop button 46, as by depressing play-record button 34, spring 60 returns lever 50 to its normal position, rotating arm 54 in a counterclockwise direction so as to space the brake band 52 from the brake drum 16 where it is effective to introduce a drag on drum 16 but not inhibit rotation thereof.

The aforedescribed construction is conventional and provides the setting in which the present invention is found. As described a feature of the invention is that it constitutes auxiliary means which permit temporarily moving brake band 52 against drum 16 and to resist turning thereof while also relieving pressure roller 28 so as to permit halting of the tape travel without disturbing the set of the play-record button 34, for example. Referring therefore to FIGURES 2 and 3, which are to be considered in conjunction with FIGURE 1, slidably supported on base plate 12 is a brake-actuating arm or slide 70 shown connected thereto as by a pair of shoulder rivets 74, 74 extended through provided slots 76, 76. As illustrated by FIGURE 1, slots 76, 76 are elongated in the direction of the longitudinal axis of slide member 70 such that member 70 can be moved longitudinally in a direction toward brake drum 16 a distance sufficient to permit its upturned end 78 to engage the free end of spring arm 80 which is shown connected to brake bearing arm 54, as by rivet 82. Movement of slide 70 in this direction has the effect therefore of rocking arm 54 about its pivot 56 and so as to urge brake 52 into frictional engagement with drum 16. Brake-actuating arm 70 therefore serves, when moved longitudinally, to actuate brake 52 independently of stop button 46. The opposite end 84 of arm 70 is also upturned, as shown in FIGURE 4. At 86 is a second longitudinal arm or member comprising a first class lever pivotally mounted intermediate its ends to swing about shaft 88. One end 85 thereof is positioned to be engaged by upturned end 84 of arm 70 when moved a sufficient distance to actuate brake 52 by the rocking of its supporting arm 54. The opposite end of lever 86 is bifurcated, as at 90 and engages about a guide pin 92 projecting from pressure roller guide 30 to which it is fixedly attached. It will therefore be apparent that when lever 70 is moved in one direction so as to cause its end 78 to move brake band 52 into frictional engagement with drum 16, its other end 84 also effectively rotates lever 86 about shaft 88 so as to move pressure roller 28 away from the capstan 26 by further compressing spring 40. Tape 20 thereupon is released from its frictional engagement with capstan 26 and its further advance being simultaneously braked by the application of brake member 52 on drum 16 is nearly instantly halted. It will be appreciated that both these actions are obtained without actuating either stop button 46 or play-record button 34. It will be further appreciated that by reason of the greater spacing of its end 85 from shaft 88 than the spacing of its bifurcated end 90 from shaft 88, lever 86 requires only a minimum amount of force at its end 85 to further compress spring 40 and thereby to effect movement of the pressure roller 28 away from the capstan 26.

A particularly important feature of the invention is the novel construction of the actuating means by which said longitudinal movement of lever 70 is effected to brake the supply reel 18 and release frictional engagement of the tape between pressure roller 28 and capstan 26 and by-passing stop button 46 and play-record button 34. As shown best in FIGURES 2 and 3, such actuating means comprises a button 96 conveniently mounted at the front of the machine 10 and in the upper wall thereof so as to be depressible by rotation about horizontally disposed shaft 98. As perhaps shown best by FIGURES 2 and 3, shaft 98 is supported between the spaced ears of a bracket 102 riveted to an offset portion 104 of the base plate 12. As shown best in FIGURES 2 and 5, button 96 comprises a finger-press portion 106 and an actuating portion 108 both of which are radially offset from shaft 98 defining the axis about which button 96 is depressible. FIGURE 2 illustrates the "at rest" position of button 96 with its finger-press portion 106 extended vertically and its actuating part 108 provided with a flat surface 110 vertically disposed and engaging the adjacent side of upturned portion 84 of lever 70, lever 70 being in its normally retracted position, as illustrated by FIGURE 1.

By pulling finger-press portion 106 forward, its engagement portion 108 is rotated about shaft 98 effectively moving lever 70 away therefrom and into engagement with spring portion 80 of the reel brake mechanism 52, 54. Finger portion 106 is pulled forwardly until it assumes the position illustrated by FIGURE 5, which represents a distance of about 45° and until its lower engagement portion 112 engages stop 114 comprising the end of offset portion 104 of base plate 12. In this new position, as illustrated by FIGURE 4, lever 70 has been moved to its forward position where its forward upturned end 78 engages spring actuating arm 80 effectively rotating arm 54 about shaft 56 so as to urge brake 52 into frictional binding engagement with the drum 16 of spindle 14. It also has moved a distance sufficient to bring its upturned rear end 84 into engagement with the free end 85 of lever 86 and effectively rotate lever 86 about its pivotal connection at 88 (FIG. 1) to move its bifurcated end 90 and thereby guide 30 and the pressure roller 28 away from capstan 26 and disengage tape 20 from therebetween and the capstan 26. Also, as illustrated in FIGURE 5, in this new position of button 96 with its lower engagement portion 112 abutting stop 114, end 116 of the engagement portion 108 has been rotated to a height where it lies above a horizontal plane represented by dash lines A—A which intersects the axis of shaft 98 about which button 96 rotates and lies generally parallel to the direction of the effected longitudinal movement of actuating arm 70.

As illustrated by the several views, the effected movement of actuating arm 70 is resisted by a spring 118 shown connected at one end 120 to the upturned end 78 of lever 70 and at its opposiite end 122 to the free end of lever 86. Thus in the longitudinal movement of lever 70, not only does the engagement of upturned end 84 of arm 70 with the free end of lever 86 effectively rotate it about supporting shaft 88, but also said end 84 is shown spaced from the free end of lever 86 so that in said movement of lever 70 spring 118 is also stretched and available to react on button 96 through end 84. Because portion 84 of lever 70 now engages button 96 at 116 which is to the upper side of plane A—A, spring 118 therefore acts to hold the button and more particularly its abutment part 112 against stop 114. Consequently, button 96 remains locked in its new or depressed position as illustrated by FIGURE 5 and both arm 70 and lever 86 remain locked in the positions to which they have been moved by the described rotation of button 96. The advance of tape 20 is therefore interrupted until button 96 is rotated in the reverse direction back to its original position, as illustrated by FIGURE 2. Once button 96 has thus been rotated to its original position as illustrated by FIGURE 2, the reactive force of spring 118 in cooperation with the also previously tensioned spring arm 80 returns lever 70 to its first position, relieving the frictional engagement of brake 52 on drum 16. Simultaneously also, the compressive force of spring 40 takes over to return guide 30 and pressure roller 28 back into frictional engagement with capstan 26 and tape 20 interposed therebetween. The action of spring 40 is also cumulative with the action of spring 118 through lever 86 to return lever 70 to its first of FIGURE 1 position. The release of brake 52 from drum 16 and the reengagement of pressure roller 28 on the tape about capstan 26 occurs almost instantaneously with the clockwise rotation of button 96 to its first position.

It will thus be apparent that the described relation of actuating arm 70, lever 86, actuating button 96, together with springs 118 and 40, provide a simple, yet highly effective and positive braking action on the supply reel 18 and release of pressure roller 28 so that the advance of the tape 20 whether the machine is set for playing or recording can be obtained conveniently and instantaneously with a minimum amount of effort and required attention on the part of the operator. All that is required to stop the recording or playing, as the case may be, is to pull the actuating button 96 forwardly and in a downward direction as far as it will go. This action automatically, and without more, locks the button. However, the tape can be instantly restarted by rotating button 96 back to its original position. Thus, the entire operation of interrupting the tape advance and restarting it is clean and smooth to carry out as well as in its functioning.

It will thus be apparent that all of the recited objects, advantages and features of the invention have been demonstrated as obtainable in a highly practical and entirely feasible and efficient manner. It will furthermore be understood that many other variations, as well as rearrangements and substitutions of the described parts may be had within the spirit of the invention, the aforesaid description and illustration represented by the drawings, being intended merely as illustrative of one embodiment of the invention.

Thus having described my invention, I claim:

1. In a tape machine having a releasable tape drive effecting mechanism for moving tape off a rotatable reel across an information translating head, a reel brake for inhibiting rotation of the reel, a stop member actuatable to set the reel brake, and an operating member actuatable for setting the tape drive effecting mechanism and releasing the reel brake, the combination therewith of pause control means for temporarily halting the tape independently of the stop operating members, said pause control means including a first member mounted for longitudinal movement into and out of a position where it sets the reel brake independently of the setting thereof by said stop and operating members, a second member operatively associated with said first member to release the tape drive effecting mechanism when the first member is moved into said position, a further member mounted to turn about an axis disposed transversely to the direction of said longitudinal movements of the first member, said further member including an axially offset part having a first portion which normally engages the first member, and a second portion of longer radius which is moved into engagement with said first member by rotation of said further member on its axis through a limited arc in one direction so as to move the first member into its reel brake setting position, said engagement of the portion of longer radius being obtained to one side of a center line including said axis about which said rotatable member turns, said further member having an abutment angularly displaced from said part, and a stop engaged by said abutment of the further member when it is turned so as to locate the portion of longer radius in engagement with the first member, and spring means tensioned by said movement of the first member into its brake setting position for urging said first member against said part of the further member and thereby to hold said further member against the stop and releasably lock the reel brake and hold the tape drive effecting mechanism in released condition, said spring means serving to return the first and second members to their normal position on turning of the further member in the opposite direction to return its part to the other side of said center line.

2. In a tape machine having a releasable tape drive effecting mechanism for moving tape off a rotatable reel across an information translating head, and a reel brake for inhibiting rotation of the reel, the combination of a first member mounted for longitudinal movement into and out of a position where it sets the reel brake, a second member operatively associated with said first member to release the tape drive effecting mechanism when the first member is moved into said position to set the reel brake, said first member including an upturned end having a flat side, a rotatable member mounted adjacent said upturned end of the first member to turn about an axis disposed transversely to the direction of said movements of the first member, said rotatable member including an axially offset part having a flat side which engages the adjacent flat side of said upturned end when the first member is out of said reel brake setting position, said rotatable member being turnable on its axis in one direction so as to move an edge of said flat side of said axially offset part into engagement with the flat side of the adjacent upturned end of the first member at a locus to one side of a center line including said axis about which said rotatable member turns and generally parallel to the direction of longitudinal movement of the first member, a stop positioned to be engaged by a peripheral portion of said rotatable member the opposite side of said center line when it is turned in said direction through a sufficient angle to obtain said engagement of the edge of the flat side of the offset part with the upturned end of the first member, and spring means tensioned by said movement of the first member into its brake setting position for urging said rotatable member against the stop and thereby to releasably lock the reel brake and hold the tape drive effecting mechanism in released condition, said spring means serving to return the first and second members to their normal position on turning of the rotatable member in the opposite direction.

3. In a tape machine having a releasable tape drive effecting mechanism for moving tape off a rotatable reel across an information translating head, and a reel brake for inhibiting rotation of the reel, the combination of a first member mounted for longitudinal movement into and out of a position where it sets the reel brake, said first member including an upturned end, a second member comprising a pivotally connected lever having one end in position to be engaged by said upturned end when the first member is longitudinally moved into its reel brake actuating position, the other end of said lever being located to release the tape drive effecting mechanism when the lever is pivoted by movement of the first member into said position where it sets the reel brake, a rotatable member mounted to turn about an axis disposed transversely to the direction of said movements of the first member, said rotatable member including an axially offset part having a flat side which engages the adjacent side of said upturned end of the first member when it is out of said reel brake setting position, said rotatable member being turnable on its axis in one direction so as to cause said offset part to move the first member into its reel brake setting position and pivot the second member to release the tape drive effecting mechanism, said offset part being thereby rotated by a center line including said rotational axis and generally parallel to the longitudinal movement of the first member, a stop located to be engaged by a further part of said rotatable member when it is turned in said direction to locate its offset part past said center line, and spring means connected between the first member and said free end of the second member and located so as to be tensioned by said movement of the first member into its brake setting position, said spring means thereby urging further peripheral portion of the rotatable member against the stop so as to releasably lock the reel brake and hold the taped drive effecting mechanism in released condition.

4. In a tape recorder, the combination of a reel-brake operating member and means for temporarily effecting actuation thereof comprising a first member mounted for reciprocal longitudinal movement, said first member when moved in one direction effecting actuation of the reel-brake operating member and when moved in the opposite direction relieving said actuation, a manually operable member mounted adjacent to one end of said lever and turnable on an axis disposed generally transversely to said reciprocal movement of the lever, said operating member including a first part located to engage said first member and having a portion of longer radial spacing from the axis of rotation of the operating member which is effective to move the first member longitudinally in said one direction upon rotation of said operating member to effect operation of the brake-operating member, stop means positioned to be engaged by an abutment on said manually operating member when it has been turned through an angle sufficient to locate said portion of longer radial spacing into engagement with the first member, the engagement of said abutment with the stop means and the engagement of said portion of longer radial spacing with the first member being on opposite sides of a center line including said axis of rotation and generally parallel to said reciprocal movement of the first member, and spring means located to resist movement of the first member in said one direction with said turning of the manually operated member and thereby to releasably hold the first member in its brake actuating position, said spring means serving to return the first member to its normal position on turning of the operable member in the opposite direction.

5. The combination of claim 4 also including releasable tape drive effecting means, and an actuating lever therefor, said lever having one end operatively associated with the first member to release the tape drive effecting means when said first member is moved in said one direction so as to actuate the reel braking means.

References Cited

UNITED STATES PATENTS

| | | | |
|---|---|---|---|
| 2,793,039 | 5/1957 | Hironimus | 274—4 |
| 2,898,055 | 8/1959 | Genning et al. | 242—55.12 |

LEONARD D. CHRISTIAN, *Primary Examiner.*